United States Patent
Nakahama

(10) Patent No.: US 8,560,800 B2
(45) Date of Patent: Oct. 15, 2013

(54) ELECTRONIC DEVICE AND CONTROL METHOD THEREOF

(75) Inventor: Takayuki Nakahama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 12/834,574

(22) Filed: Jul. 12, 2010

(65) Prior Publication Data

US 2011/0029745 A1 Feb. 3, 2011

(30) Foreign Application Priority Data

Jul. 30, 2009 (JP) .................................. 2009-178352

(51) Int. Cl.
*G06F 12/00* (2006.01)

(52) U.S. Cl.
USPC .................... 711/170; 711/E12.069; 711/115

(58) Field of Classification Search
USPC .......................................................... 711/170
See application file for complete search history.

(56) References Cited

U.S. PATENT DOCUMENTS 7,046,519 B2    5/2006    Nakamura

FOREIGN PATENT DOCUMENTS

JP    2004-246623    9/2004

*Primary Examiner* — Reginald Bragdon
*Assistant Examiner* — Hamdy S Ahmed
(74) *Attorney, Agent, or Firm* — Cowan, Liebowitz & Latman, P.C.

(57) ABSTRACT

An electronic device comprises: a mounting unit in which a first storage medium to be mounted; an acquiring unit configured to acquire attribute information of a mounted storage medium; a first determining unit configured to determine whether or not the mounted storage medium is a storage medium having a function other than a storage function based on the attribute information; a transmitting unit configured to transmit a command that can be used in a function other than a storage function to the mounted storage medium, in a case where it is determined that the storage medium is not a storage medium having the function other than the storage function; and a second determining unit configured to determine whether or not the mounted storage medium has the function other than the storage function based on whether or not there is a response to the transmitted command.

19 Claims, 5 Drawing Sheets

FIG. 5A
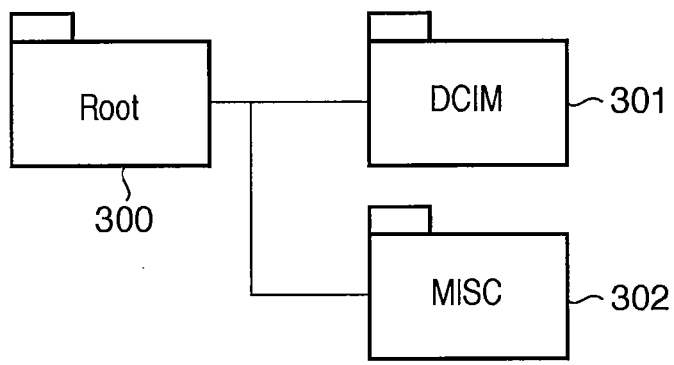
FIG. 5B
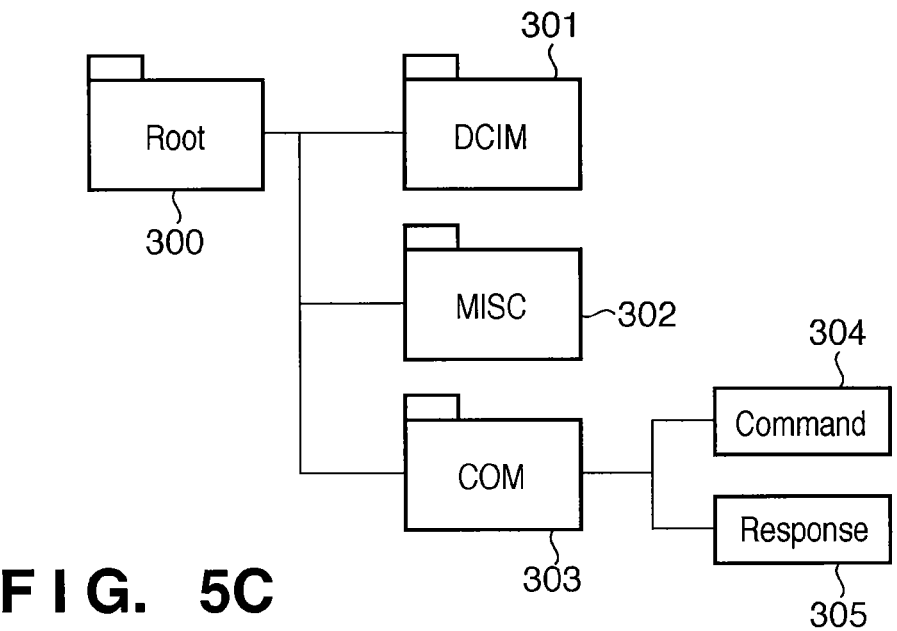
FIG. 5C
A COMMUNICABLE
CARD HAS BEEN
RECOGNIZED.

ELECTRONIC DEVICE AND CONTROL METHOD THEREOF

BACKGROUND OF THE INVENTION

1. Field of the Invention

The present invention relates to a technique that can discriminate the type of a storage medium mounted in an electronic device.

2. Description of the Related Art

Examples of memory cards used in digital cameras include a CF® card, a SmartMedia, an xD-Picture Card®, an SD® card, and the like, which have different external configurations or interface specifications. Furthermore, some memory cards have not only a data storing function but also special functions such as a communication function. Some digital cameras are switched to a control optimized to the type or the function of a memory card. Here, current digital cameras are provided with card slots respectively corresponding to various memory cards having different specifications, and memory cards that are not originally intended can be mounted in the card slots using card adapters.

However, since digital cameras cannot discriminate the type of a memory card mounted using a card adapter, the digital cameras may not be switched to a control optimized to the type or the function of the memory card as described above. Thus, Japanese Patent Laid-Open No. 2004-246623 discloses a technique for discriminating the type of a memory card mounted in a card slot using a card adapter.

However, in order to discriminate the type of a memory card as in Japanese Patent Laid-Open No. 2004-246623, a dedicated card adapter having a function that can discriminate a memory card is necessary.

SUMMARY OF THE INVENTION

The present invention has been conceived in view of the above problems, and the present invention realizes a technique that can discriminate the type of a card so that an appropriate control optimized to the card can be performed even in the case where a memory card that is not originally intended is mounted in a card slot using a card adapter.

In order to solve the aforementioned problems, the present invention provides an electronic device, comprising: a mounting unit in which a first storage medium having a first configuration is to be mounted; an acquiring unit configured to acquire attribute information of a storage medium mounted in the mounting unit from the storage medium; a first determining unit configured to determine whether or not the storage medium mounted in the mounting unit is a storage medium having a function other than a storage function based on the attribute information acquired by the acquiring unit; a transmitting unit configured to transmit a command that can be used in a function other than a storage function to the storage medium mounted in the mounting unit, in a case where it is determined by the first determining unit that the storage medium is not a storage medium having the function other than the storage function; and a second determining unit configured to determine whether or not the storage medium mounted in the mounting unit has the function other than the storage function based on whether or not there is a response to the command transmitted by the transmitting unit.

The present invention also provides an electronic device, comprising: a mounting unit in which a first storage medium is to be mounted; an acquiring unit configured to acquire attribute information of a storage medium mounted in the mounting unit; a determining unit configured to determine whether or not the storage medium mounted in the mounting unit is the first storage medium based on the attribute information acquired by the acquiring unit; a transmitting unit configured to transmit a command for communicating with the storage medium mounted in the mounting unit, in a case where it is determined by the determining unit that the storage medium mounted in the mounting unit is not the first storage medium; a discriminating unit configured to discriminate the type of the storage medium mounted in the mounting unit based on whether or not there is a response to the command transmitted by the transmitting unit; and a control unit configured to switch an operation of the device based on a result of the discrimination by the discriminating unit.

The present invention also provides a control method of an electronic device that has a mounting unit in which a first storage medium having a first configuration is to be mounted, the method comprising: an acquiring step of acquiring attribute information of a storage medium mounted in the mounting unit from the storage medium; a first determining step of determining whether or not the storage medium mounted in the mounting unit is a storage medium having a function other than a storage function based on the attribute information acquired in the acquiring step; a transmitting step of transmitting a command that can be used in a function other than a storage function to the storage medium mounted in the mounting unit, in a case where it is determined in the first determining step that the storage medium is not a storage medium having the function other than the storage function; and a second determining step of determining whether or not the storage medium mounted in the mounting unit has the function other than the storage function based on whether or not there is a response to the command transmitted in the transmitting step.

The present invention also provides a control method of an electronic device that has a mounting unit in which a first storage medium is to be mounted, the method comprising: an acquiring step of acquiring attribute information of a storage medium mounted in the mounting unit; a determining step of determining whether or not the storage medium mounted in the mounting unit is the first storage medium based on the acquired attribute information; a transmitting step of transmitting a command for communicating with the storage medium mounted in the mounting unit, in a case where it is determined that the storage medium mounted in the mounting unit is not the first storage medium; a discriminating step of discriminating the type of the storage medium mounted in the mounting unit based on whether or not there is a response to the transmitted command; and a control step of switching an operation of the device based on a result of the discrimination.

According to the present invention, it is possible to discriminate the type of a card so that an appropriate control optimized to the card can be performed even in the case where a memory card that is not originally intended is mounted in a card slot using a card adapter.

Further features of the present invention will become apparent from the following description of exemplary embodiments with reference to the attached drawings.

BRIEF DESCRIPTION OF THE DRAWINGS

FIG. 5A is a diagram showing the directory configuration according to an ordinary file system.

FIG. 5B is a diagram showing the directory configuration of this embodiment.

FIG. 5C is a view showing a display example of this embodiment.

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

Embodiment 1

Figure 1:
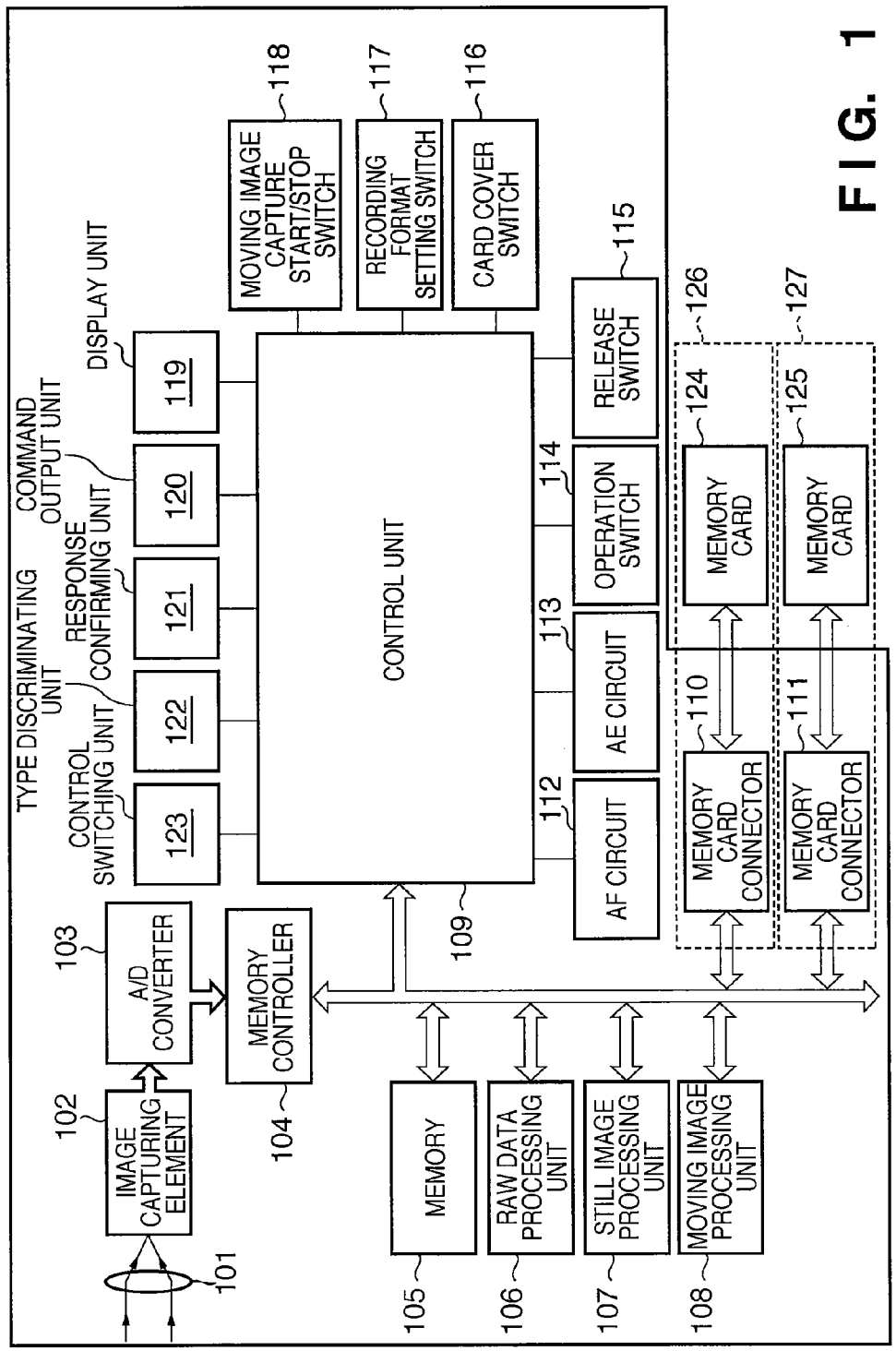
FIG. 1 is a block diagram showing an example of the configuration of an image capturing apparatus of an embodiment according to the present invention.

Hereinafter, the configuration of a digital still camera of this embodiment will be described with reference to FIG. 1. In FIG. 1, an electronic device of this embodiment is an image capturing apparatus such as a digital camera, and is provided with an image capturing element 102, such as a CMOS sensor, that receives light from an image of a subject via a capturing lens 101, and photoelectrically converts the light.

The image signals captured by the image capturing element 102 are converted by an A/D converter 103 into digital signals, and, thus, raw image data is generated. Here, digital image data that is output from the A/D converter 103, and that has not been adjusted in white balance, contrast, sharpness, color density, hue, and the like is referred to as "raw image data".

The raw image data output from the A/D converter 103 is transmitted via a memory controller 104, and stored in a memory 105. The memory 105 has a storage capacity sufficient for storing raw image data corresponding to a plurality of images, and is used as a moving image buffer when recording moving images, and as a still image buffer when recording still images.

A raw data processing unit 106 performs a scratch correcting process on the raw image data stored in the memory 105. The scratch correcting process refers to a process that corrects a portion damaged by a scratch on the image capturing element 102, dust attached to the image capturing element 102, or the like.

Furthermore, in the case where the still image recording format is RAW format, the raw data processing unit 106 further performs lossless compression according to a predetermined lossless compression method (an individually determined lossless compression method, a lossless compression method as defined in JPEG2000 or TIFF, etc.).

In the case where the recording format is JPEG, a still image processing unit 107 performs a predetermined image process (a process that adjusts white balance, contrast, sharpness, color density, hue, and the like) on the image data output from the raw data processing unit 106. Furthermore, the still image processing unit 107 performs compression according to baseline JPEG, and generates still image data for recording.

When recording moving images, image signals captured by the image capturing element 102 in constant periods (for example, $\frac{1}{30}$ sec periods) are converted by the A/D converter 103 into digital signals, and raw image data is generated. The original image data output from the A/D converter 103 is transmitted via the memory controller 104 and stored in the memory 105, and transmitted to a moving image processing unit 108.

The moving image processing unit 108 uses a color difference data generating circuit, an image resizing circuit, and a predetermined moving image compression circuit according to MPEG or the like to generate image data for recording. Then, the generated still image data and moving image data is recorded in a memory card 124 or a memory card 125 that is detachably mounted in a memory card slot 126 or 127 of the image capturing apparatus and connected to a memory card connector 110 or 111. Here, a memory card refers to a card-type storage medium having a built-in non-volatile semiconductor memory.

Memory cards having specific configurations can be detachably mounted respectively in the memory card slots 126 and 127, and, in this embodiment, a memory card in the shape of an SD card can be detachably mounted in the memory card slot 126 and connected to the memory card connector 110, and memory cards having other shapes cannot be mounted or connected. Furthermore, a memory card in the shape of a CF card can be detachably mounted in the memory card slot 127 and connected to the memory card connector 111, and memory cards having other shapes cannot be mounted or connected.

Numeral 119 denotes a display unit, such as a liquid crystal display apparatus, a loudspeaker, or the like, that displays moving image statuses, messages, and the like using characters, images, sounds, and so on according to execution of a program by a control unit 109. One or a plurality of display units 119 are arranged at positions that can be easily seen in the vicinity of the operation unit of the camera, and are configured from, for example, a combination of an LCD, an LED, a sound-producing element, and the like.

Among contents displayed on the display unit 119, examples of contents displayed using an LCD or the like include those indicating, for example, single shooting or continuous shooting, self-timer, compression ratio, the number of recording pixels, the number of recordable images, the remaining number of images that can be captured, and the like. Further examples thereof include those indicating shutter speed, aperture value, exposure correction, flash, red-eye reduction, macro photography, buzzer settings, remaining clock battery level, remaining battery level, errors, and the like. Further examples thereof include those indicating information represented by a number in a plurality of digits, a state of a memory card attached to or detached from the memory card connector 110 or 111, operation of a communication I/F, date and time, a state of the camera connected to an external computer, and the like.

Furthermore, among contents displayed on the display unit 119, examples of contents displayed using an LED or the like include those indicating, for example, a focused state, completion of capture preparation, camera shake warning, flash lamp charging, completion of flash lamp charging, writing operation in a memory card, and the like. Further examples thereof include those indicating notice of macro photography settings, a state of a secondary battery charged, and the like. Furthermore, among contents displayed on the display unit 119, examples of contents displayed using a lamp or the like include those indicating, for example, notice of self-timer and the like. This lamp that gives notice of self-timer may be used also as an AF assist lamp.

An AF circuit 112 is a circuit for automatically detecting a focus, and an AE circuit 113 is a circuit for determining an exposure of a captured image. An operation switch 114 is a switch for setting various capture conditions, and sets a moving image mode or a still image mode, ISO sensitivity, and other capture conditions. A release switch 115 has a first and a second stroke, and, when capturing a still image, if a SW 1 is turned on with the first stroke, AF, AE, and other capture preparing operations are started, and if a SW 2 is turned on with the second stroke, still image capturing operations are performed. A card cover switch 116 is provided for opening/closing a cover of a memory card slot 126 and/or 127. A recording format setting switch 117 is for setting a data recording format when capturing a still image, and sets RAW format or JPEG format as a format used when recording captured data. A moving image capture start/stop switch 118 is a switch for starting a moving image recording operation, and, if the moving image capture start/stop switch 118 is pressed in a state where the operation switch 114 has set the capture mode to a moving image mode, a moving image recording operation is started.

Figure 2:
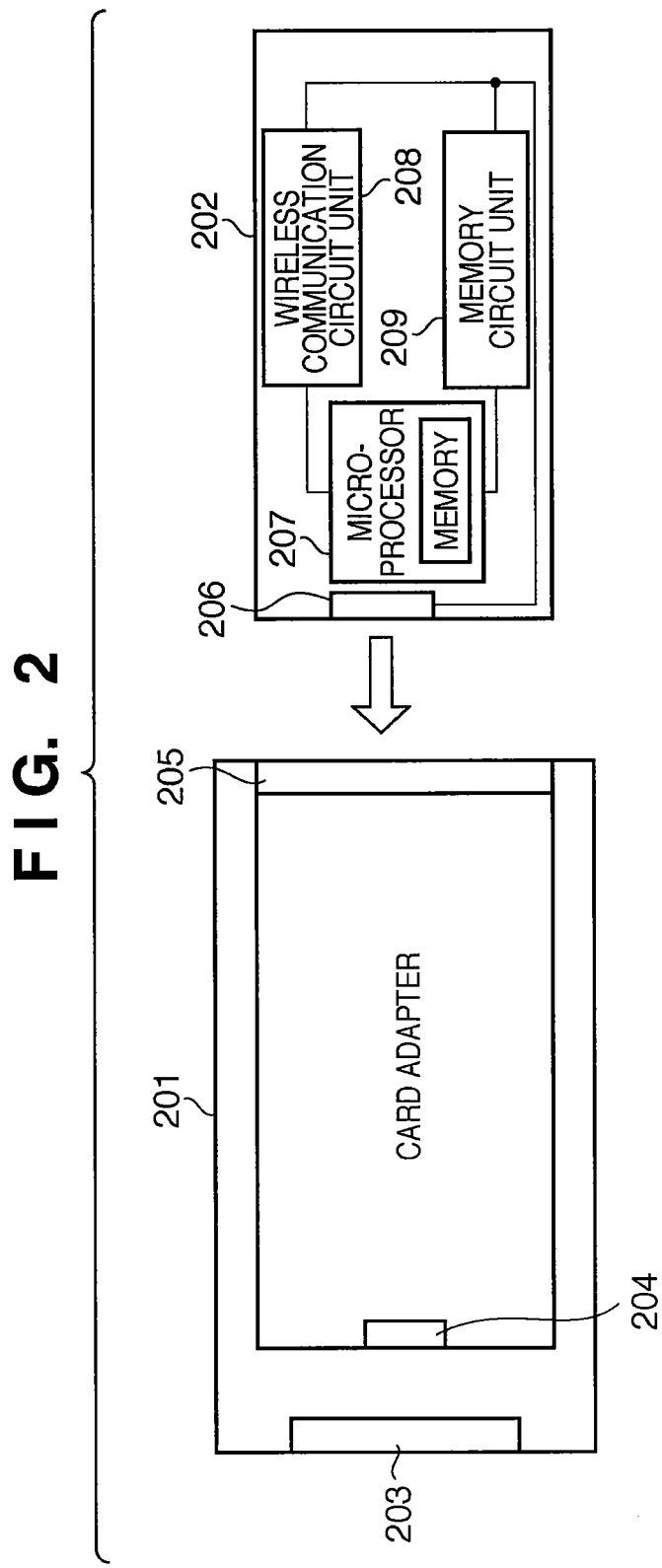
FIG. 2 is a block diagram showing an example of the configuration of a card adapter and a memory card of this embodiment.

Next, the configuration of a card adapter 201 and a communicable memory card 202 of this embodiment will be described with reference to FIG. 2. In FIG. 2, the card adapter 201 is used to electrically connect a connection unit of a memory card to a connection point of a card slot for a memory card supporting a different standard. In this embodiment, the card adapter 201 enables an SD card to be inserted and used in a card slot for a CF card supporting a different standard. More specifically, when the memory card 202 is inserted from a memory card insertion unit 205, and a connection unit of the memory card 202 and a connection unit 204 of the card adapter 201 are brought into contact with each other, access to the memory card 202 can be established via the card adapter 201.

While an ordinary memory card has only a data storage function, the memory card 202 has not only a data storage function but also a wireless communication function (hereinafter, this sort of card is referred to as a "communicable memory card"). The communicable memory card 202 has a connector 206, a microprocessor 207 including a memory such as a register, a wireless communication circuit unit 208, and a memory circuit unit 209. The connector 206 enables the communicable memory card 202 to be connected to image capturing apparatuses, other information processing apparatuses, and the like. The communicable memory card 202 can be detachably mounted in the memory card connector 110 in the memory card slot 126 for an SD card provided in the image capturing apparatus. The connector 206 functions as an interface that exchanges data with the image capturing apparatus when being connected to the memory card connector 110. The connector 206 mechanically and electrically connects the communicable memory card 202 and the image capturing apparatus.

Here, in this embodiment, an SD card standard-supporting communicable memory card is mounted, via a CF standard-supporting adapter, in a CF standard-supporting memory card slot. However, the standard is not limited to these, and storage media and adapters may support other standards.

When the communicable memory card 202 is connected via the connector 206 to the image capturing apparatus, the communicable memory card receives supply of electrical power via a power source line from the image capturing apparatus, and is initialized by a reset circuit, thereby starting the operation and communicating with the image capturing apparatus via a bus line. The wireless communication circuit unit 208 has a function of wirelessly transmitting data to electronic devices, other information processing apparatuses, and the like having a similar wireless communication function. That is to say, the wireless communication circuit unit 208 communicates data with electronic devices having a wireless communication function. The wireless communication circuit unit 208 uses, for example, radio waves of a wireless LAN to perform wireless communication, but may use infrared rays in the communication format. The memory circuit unit 209 is configured from a non-volatile rewritable memory element such as an EEPROM, a flash EEPROM, or the like, and has a function of recording data received from a connected device via the connector 206. The microprocessor 207 has a built-in memory, and controls, according to a control procedure stored in advance in the memory, communication with a connected device via the connector 206, the wireless communication circuit unit 208, and the memory circuit unit 209.

An ordinary memory card performs data communication with a device connected to the card, according to a specification as defined in the standard of the memory card, for example, according to an SD card standard. Meanwhile, the communicable memory card 202 is a memory card that performs data communication according to the card standard, but communicates with an electronic device using a file system, which is an upper-level concept irrelevant to the card standard, regarding contents that are not defined in the card standard, such as a communication state.

Hereinafter, file systems used by the communicable memory card 202 will be described with reference to FIGS. 5A to 5C. These file systems are generated in the memory circuit unit 209 of the memory card. An ordinary file system has a tree-like configuration as shown in FIG. 5A, and has a root directory 300 at the highest level. A user can generate subdirectories 301 and 302, files, and the like below the root directory 300. Meanwhile, FIG. 5B shows an example of the folder configuration of the communicable memory card 202 that performs communication using a file system. In addition to the directories "DCIM" and "MISC" shown in FIG. 5A, a communication controlling directory 303, and communication controlling files 304 and 305 in that directory are generated so that the communicable memory card 202 can perform communication using the file system. Here, the file 304 is a command transmitting file, and is used when a connected device using the communicable memory card 202, that is, the image capturing apparatus in this embodiment, gives a specific request to the card. Furthermore, when unique character strings, numerical values, or the like are written to the command transmitting file 304, a request (command) can be issued to the communicable memory card 202. Meanwhile, the file 305 is a response receiving file that is prepared so that the communicable memory card 202 can respond to a command from a device connected to the card. The communicable memory card 202 can respond to a command from a device connected to the card, by writing specific data to the response receiving file 305. Using the above-described file system, the memory card can perform communication that does not depend on the communication standard unique to the card.

In this embodiment, a command transmitting file and a command responding file are used, but a command transmitting folder and a command responding folder may be provided instead of these files, and files indicating a command that is to be transmitted or information corresponding to a response may be written to these folders. That is to say, a command transmitting area and a command responding area need only be provided in a storage area (memory circuit unit) of the memory card, and these areas may be used to transmit a command or to respond thereto.

Figure 3:
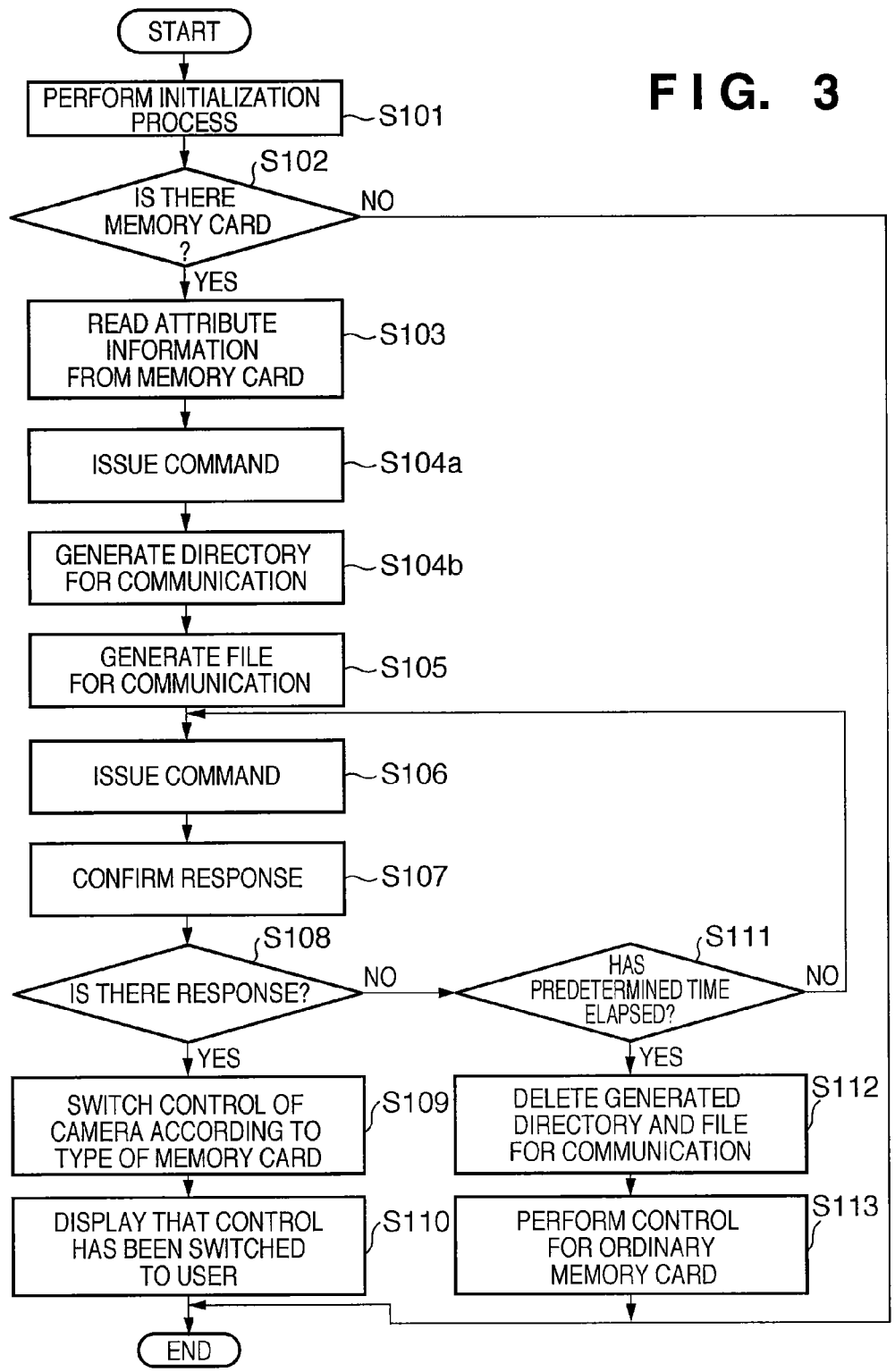
FIG. 3 is a flowchart showing an operation of the image capturing apparatus in Embodiment 1.

Next, an operation of the image capturing apparatus in which a memory card has been mounted in this embodiment will be described with reference to FIG. 3. Here, in the following description, it is assumed that a communicable memory card supporting the SD card standard is mounted and used in the CF card standard-supporting memory card slot 127, which supports a different standard, using the above-described card adapter 201. In FIG. 3, first, when a user operates the operation switch 114 to turn the main power of the image capturing apparatus on, the control unit 109 initializes the image capturing apparatus (S101). Next, the control unit 109 determines whether or not a memory card is mounted in the memory card slot, that is, whether or not a memory card is connected to the memory card connector 110 or 111 (S102). The determination method herein varies depending on the type of the card, but a state in which a card has been mounted can be detected by detecting a signal from the memory card via the memory card connector. For example, in the case of a CF card, signals (CD1X and CD2X) contained in interface signals of the card and used to detect that the card has been mounted are used. It is possible to determine whether or not the memory card has been mounted, by detecting these signals. Also in the case of an SD card, similar signals are provided.

Next, in the case where it is detected that a memory card has been mounted, the control unit 109 reads attribute information from the memory card so that a type discriminating unit 122 can determine the type of the memory card that has been detected to be mounted (S103). This attribute information varies depending on the memory card, but, for example, in the case of a CF card, the attribute information includes card type, timing information, card operation mode information, product information, manufacturer's name, product name, version, and the like.

Next, the control unit 109 determines the function of the memory card that has been detected to be mounted, based on the attribute information acquired from the memory card. Here, in the case where an SD card is mounted via the card adapter 201 in a card slot for a CF card, not the attribute information of the SD card that actually exchanges data, but the attribute information of the card adapter 201 is acquired. Accordingly, the function of the SD card mounted in the card adapter cannot be determined. Thus, in this embodiment, the type of a memory card mounted in the card adapter 201 is determined through S104 and its following steps.

First, a command output unit 120 issues a command to generate a directory to the card adapter 201 (S104*a*). The card adapter 201 responds to this command (actually, the microprocessor 207 of the memory card 202 mounted in the card adapter responds to this command). The control unit 109 generates a communication directory as the directory 303 in FIG. 5B, in the memory circuit unit of the memory card 202 according to the response from the card adapter 201 (the microprocessor 207) (S104*b*). The name of this directory is "COM" in FIG. 5B, but may vary depending on the type of a memory card that is to be discriminated so that each directory has a name corresponding to the memory card.

Next, the control unit 109 gives the memory card 202 an instruction to generate the command transmitting file 304 for transmitting a command and the response receiving file 305 necessary for receiving a response in the communication directory 303 generated in S104*b* (S105). Here, as in the case of the directory, the name, the size, and the like of the files may vary depending on a memory card that is to be discriminated so that each file has a name, a size, and the like corresponding to the memory card.

Next, the type discriminating unit 122 discriminates the type of the memory card using the command transmitting file and the response receiving file generated in S105 (S106 to S113). Here, first, the command output unit 120 issues to the command transmitting file 304 a specific command (characters, numerical values, etc.) as a command that is to be written (S106). That is to say, the command output unit 120 transmits an instruction to write specific information corresponding to the command to the command transmitting file 304. Accordingly, the specific information corresponding to the command is written to the command transmitting file 304. The microprocessor 207 periodically checks a state of the command transmitting file 304, and, in the case where information has been written to the command transmitting file, the microprocessor analyzes the information and discriminates the command corresponding to the information. The command issued in S106 may not be a command for discriminating the type of the memory card but a command, for example, for acquiring a state of the memory card. Here, the command not only has to be transmitted but also has to be a command for which a response from the memory card can be expected.

After the command is transmitted, a response confirming unit 121 reads the response receiving file generated in S105 from the memory card (S107). Furthermore, the response confirming unit 121 confirms the contents of the read response receiving file, and determines whether or not data for responding to the command has been written to the response receiving file in the memory card (S108). If response data has been written to the response receiving file, it is determined that there is a response to the command, and, thus, the type discriminating unit 122 can determine that the type of the memory card that is to be discriminated in this example is a communicable memory card. Then, a control switching unit 123 switches the image capturing apparatus to a control optimized to the card function based on a result of the determination in S108 (S109). That is to say, in the case where a communicable memory card has been recognized, the image capturing apparatus is switched to a control optimized to a memory card with a communication function. Furthermore, the display unit 119 displays that a memory card with a communication function is mounted as shown in FIG. 5C, and notifies the user to that effect (S110). Here, for example, in the case of a communicable memory card, the image capturing apparatus is switched to a control that does not shift the mode to an energy-saving mode while the memory card is transferring data via wireless communication. Accordingly, a situation can be avoided in which the mode is shifted to an energy-saving mode during data transfer, and the data transfer is interrupted. Furthermore, a control may be performed, for example, that cancels an automatic power-off function of automatically turning off the image capturing apparatus when it has not been operated for one minute or longer. Furthermore, the image capturing apparatus may be switched to a control that uses display for notifying a user that the memory card is transferring data using a wireless communication function.

On the other hand, if there is no change in the contents of the response receiving file read in S107, the transmission of a command in S106 and the reception of a response in S107 are repeated until a predetermined time has elapsed (S111). Accordingly, the precision in discriminating a memory card can be increased. If there is no change in the contents of the response file even when a predetermined time has elapsed in S111, the type discriminating unit 122 determines that the memory card is not a communicable memory card. Furthermore, the type discriminating unit 122 deletes the command transmitting file and the response receiving file generated in S105 (S112), and the control switching unit 123 performs a control optimized to the function of an ordinary memory card (without a wireless communication function).

According to this embodiment, even when a memory card that is not originally intended is mounted in a card slot using a card adapter, the type of the mounted memory card can be determined. Accordingly, the image capturing apparatus can be switched to a control optimized to the function of the memory card. Accordingly, for example, in the case of a communicable memory card, it is possible to perform a control that does not shift the mode of the image capturing apparatus to an energy-saving mode during data transfer, a control that newly displays a menu and the like relating to communication, or the like.

Embodiment 2

Figure 4:
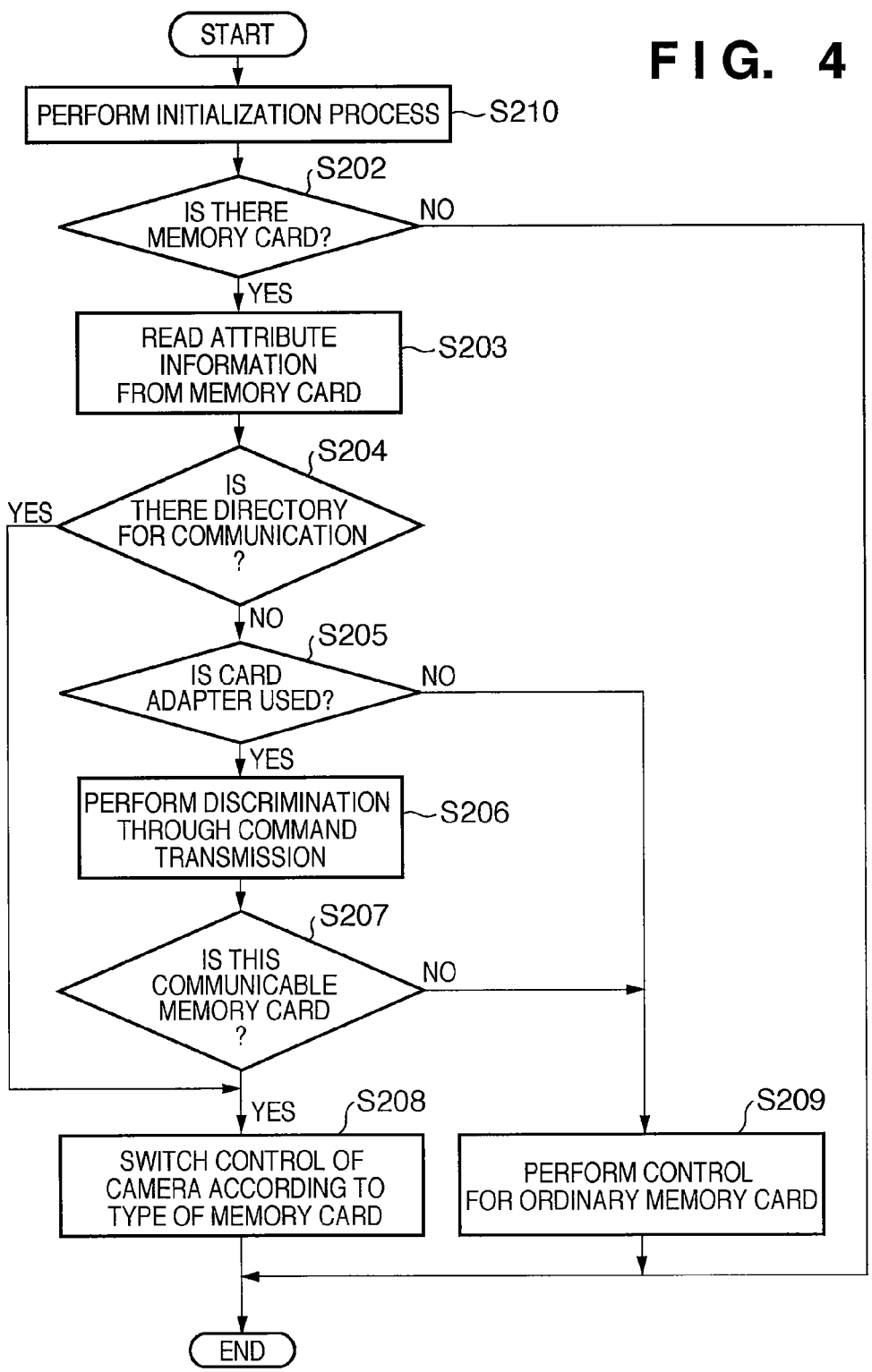
FIG. 4 is a flowchart showing an operation of the image capturing apparatus in Embodiment 2.

Next, an operation of the image capturing apparatus in which a memory card has been mounted in Embodiment 2 will be described with reference to FIG. 4. Here, also in this embodiment, it is assumed that a communicable SD card is mounted and used in a card slot for a CF card using the card adapter 201. In FIG. 4, first, in S201 to S203, the control unit 109 performs an initialization process, confirms whether or not there is a memory card, and acquires the attribute information of a memory card, as in S101 to S103 of FIG. 3. Next, the control unit 109 determines whether or not a communication directory has been already generated in the memory card (S204). If there is the communication directory 303, it is determined that this memory card is a second memory card with a communication function, and the control unit 109 switches the image capturing apparatus to a control optimized to the memory card (S208).

On the other hand, if there is no communication directory 303, the control unit 109 determines whether or not a card adapter is used based on product information contained in the attribute information acquired in S203 (S205). If it is determined in S205 that a card adapter is used, a second memory card with a communication function may be mounted, and, thus, a process that discriminates a card through transmission of a command is performed as in S106 to S108 of FIG. 3 (S206 and S207). In order to determine whether or not a card adapter is used, for example, in the case of a CF card, CIS (card information structure) is stored as the attribute information. Accordingly, in the case where, for example, "Memory Card Adapter" has been written to the version information in CIS, it is determined that a card adapter is used. On the other hand, if it is not determined in S205 that a card adapter is used, it is determined that the card is not a second memory card with a communication function, and, thus, a control optimized to the function of an ordinary memory card is performed (S209).

According to this embodiment, the precision in discriminating a card can be increased by determining whether or not a card adapter is used. Furthermore, since the type of a card can be discriminated only with the attribute information of a memory card and the presence/absence of a communication directory, processing load can be reduced.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-178352, filed Jul. 30, 2009, which is hereby incorporated by reference herein in its entirety.

What is claimed is:

1. An electronic device, comprising:
a mounting unit in which a first storage medium having a first configuration is to be mounted;
an acquiring unit configured to acquire attribute information of a storage medium mounted in the mounting unit from the storage medium;
a first determining unit configured to determine whether or not the storage medium mounted in the mounting unit is a storage medium having a function other than a storage function based on the attribute information acquired by the acquiring unit;
a second determining unit configured to determine whether or not the storage medium mounted in the mounting unit has the function other than the storage function in a case where it is not determined by the first determining unit that the storage medium is a storage medium having the function other than the storage function; and
a recording unit configured to record information that can be used in a function other than a storage function in the storage medium mounted in the mounting unit,
wherein the second determining unit determines whether or not the storage medium mounted in the mounting unit has the function other than the storage function based on whether or not there is a response to the information recorded by said recording unit, and
wherein the recording unit records the information that can be used in the function other than the storage function as a file in a predetermined directory by using a file system.

2. The device according to claim 1, further comprising a generating unit configured to generate a command transmitting area for transmitting a command to the storage medium and a command responding area for responding to the transmitted command, in the storage medium mounted in the mounting unit,
wherein the transmitting unit transmits a command that is to be transmitted to the storage medium by writing information corresponding to the command to the command transmitting area, and
the second determining unit determines whether or not there is a response to the command transmitted by the transmitting unit based on the information recorded in the command responding area.

3. The device according to claim 2,
wherein the command transmitting area is a command transmitting file provided in a specific directory, and
the command responding area is a command responding file provided in the specific directory.

4. The device according to claim 1, wherein only a storage medium supporting a specific format as defined in a specific standard is mountable in the mounting unit.

5. The device according to claim 4, wherein a storage medium supporting a standard different from the specific standard is mountable in the mounting unit via an adapter supporting the specific standard.

6. The device according to claim 5,
wherein the first determining unit discriminates whether or not the adapter is mounted in the mounting unit based on the attribute information, and
in a case where it is determined that the adapter is mounted, the second determining unit discriminates whether or not the storage medium mounted in the mounting unit has the function other than the storage function.

7. The device according to claim 1, further comprising a control unit configured to perform a control for a function other than a storage function, in a case where one of the first and the second determining units determines that the storage medium mounted in the mounting unit is a storage medium having the function other than the storage function.

8. The device according to claim 1, further comprising a notifying unit configured to notify a user that a storage medium having a function other than a storage function is mounted, in a case where one of the first and the second determining units determines that the storage medium mounted in the mounting unit is a storage medium having the function other than the storage function.

9. The device according to claim 1, wherein the function other than the storage function is a wireless communication function.

10. An electronic device, comprising:
a mounting unit in which a first storage medium is to be mounted;
an acquiring unit configured to acquire attribute information of a storage medium mounted in the mounting unit;
a determining unit configured to determine whether or not the storage medium mounted in the mounting unit is the first storage medium based on the attribute information acquired by the acquiring unit;
a discriminating unit configured to discriminate the type of the storage medium mounted in the mounting unit in a case where it is not determined by the determining unit that the storage medium mounted in the mounting unit is the first storage medium;
a recording unit configured to record information that can be used in a function other than a storage function in the first storage medium; and
a control unit configured to switch an operation of the device based on a result of the discrimination by the discriminating unit,
wherein the discriminating unit discriminates the type of the storage medium mounted in the mounting unit based on whether or not there is a response to the information recorded by said recording unit, and
wherein said recording unit records the information that can be used in the function other than the storage function as a file in a predetermined directory by using a file system.

11. The device according to claim 10, wherein a second storage medium, which is different from the first storage medium, is mountable in the mounting unit using an adapter.

12. The device according to claim 11,
wherein the discriminating unit discriminates whether or not the storage medium mounted in the mounting unit is the adapter based on the attribute information, and
in a case where it is discriminated that the storage medium is the adapter, the type of the storage medium is discriminated by transmitting the command.

13. The device according to claim 10, wherein the discriminating unit determines that the storage medium mounted in the mounting unit has a communication function, in a case where communication with the storage medium becomes possible after the command is transmitted.

14. The device according to claim 10, wherein the discriminating unit discriminates the type of the storage medium mounted in the mounting unit without transmitting the command, in a case where communication with the storage medium is already possible.

15. The device according to claim 10, further comprising a notifying unit configured to give notice of a result of the discrimination by the discriminating unit.

16. A control method of an electronic device that has a mounting unit in which a first storage medium having a first configuration is to be mounted, the method comprising:
an acquiring step of acquiring attribute information of a storage medium mounted in the mounting unit from the storage medium;
a first determining step of determining whether or not the storage medium mounted in the mounting unit is a storage medium having a function other than a storage function based on the attribute information acquired in the acquiring step;
a second determining step of determining whether or not the storage medium mounted in the mounting unit has the function other than the storage function in a case where it is not determined in the first determining step that the storage medium is a storage medium having the function other than the storage function; and
a recording step of recording information that can be used in a function other than a storage function in the storage medium mounted in the mounting unit;
wherein the second determining step determines whether or not the storage medium mounted in the mounting unit has the function other than the storage function based on whether or not there is a response to the information recorded by said recording step, and
wherein the recording step records the information that can be used in the function other than the storage function as a file in a predetermined directory by using a file system.

17. A non-transitory computer-readable medium with an executable program stored thereon, wherein the program instructs a microprocessor to perform the method according to claim 16.

18. A control method of an electronic device that has a mounting unit in which a first storage medium is to be mounted, the method comprising:
an acquiring step of acquiring attribute information of a storage medium mounted in the mounting unit;
a determining step of determining whether or not the storage medium mounted in the mounting unit is the first storage medium based on the acquired attribute information;
a discriminating step of discriminating the type of the storage medium mounted in the mounting unit in a case where it is not determined that the storage medium mounted in the mounting unit is the first storage medium;
a recording step of recording information that can be used in a function other than a storage function in the first storage medium
a control step of switching an operation of the device based on a result of the discrimination,
wherein the discriminating step discriminates the type of the storage medium mounted in the mounting unit based on whether or not there is a response to the information recorded by said recording unit, and wherein the recording step records the information that can be used in the function other than the storage function as a file in a predetermined directory by using a file system.

19. A non-transitory computer-readable medium with an executable program stored thereon, wherein the program instructs a microprocessor to perform the method according to claim 18.

* * * * *